United States Patent
Shiraishi et al.

(10) Patent No.: US 8,834,741 B2
(45) Date of Patent: Sep. 16, 2014

(54) LIQUID CRYSTAL POLYESTER RESIN COMPOSITION AND CAMERA MODULE COMPONENT

(75) Inventors: Miyuki Shiraishi, Tokyo (JP); Toshio Nakayama, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 33 days.

(21) Appl. No.: 13/877,825

(22) PCT Filed: Oct. 11, 2011

(86) PCT No.: PCT/JP2011/073325
§ 371 (c)(1),
(2), (4) Date: May 28, 2013

(87) PCT Pub. No.: WO2012/050082
PCT Pub. Date: Apr. 19, 2012

(65) Prior Publication Data
US 2013/0253118 A1 Sep. 26, 2013

(30) Foreign Application Priority Data

Oct. 15, 2010 (JP) ................................ P2010-232719

(51) Int. Cl.
*C09K 19/38* (2006.01)
*C08K 3/04* (2006.01)
*C08K 3/30* (2006.01)
*C08L 67/03* (2006.01)
*C09K 19/54* (2006.01)
*C08K 7/14* (2006.01)

(52) U.S. Cl.
CPC ... C08K 3/04 (2013.01); C08K 7/14 (2013.01); C08K 3/30 (2013.01)
USPC .................. 252/299.01; 252/299.5; 524/423; 524/424

(58) Field of Classification Search
CPC ........ C09K 19/3809; C08K 3/04; C08K 3/30; C08L 67/03

USPC .................. 252/299.01, 299.5; 524/423, 424
See application file for complete search history.

(56) References Cited

U.S. PATENT DOCUMENTS

2002/0028906 A1 * 3/2002 Long et al. .................... 528/190

FOREIGN PATENT DOCUMENTS

| CN | 101747650 A | 6/2010 |
|---|---|---|
| JP | 2000-215732 A | 8/2000 |
| JP | 2002-104367 A | 4/2002 |
| JP | 2002-179779 A | 6/2002 |
| JP | 2009-228177 A | 10/2009 |
| JP | 2010-106165 A | 5/2010 |
| JP | 2010-195874 A | 9/2010 |
| TW | 200944559 A | 11/2009 |
| TW | 201035231 A | 10/2010 |

OTHER PUBLICATIONS

English translation by computer for JP 2010-195874, http://www4.ipdl.inpit.go.jp/Tokujitu/PAJdetail.ipdl?N0000=60&N0120=01&N2001=2&N3001=2010-195874.*
Search report from International Patent Appl. No. PCT/JP2011/073325, mail date is Nov. 15, 2011.
International Preliminary Report on Patentability Appl. No. PCT/JP2011/073325, mail date is May 16, 2013.
Chinese Office Action issued with respect to Chinese Application No. 201180049847.3, mail date is Jan. 6, 2014.

* cited by examiner

*Primary Examiner* — Shean C Wu
(74) *Attorney, Agent, or Firm* — Greenblum & Bernstein, P.L.C.

(57) ABSTRACT

The present invention has the object to provide a liquid crystal polyester resin composition capable of obtaining a molded body which is not easily fibrillated, and a camera module component by molding the same. The liquid crystal polyester resin composition of the present invention contains 5 to 40 parts by volume of barium sulfate (B) having a particle size of 1 μm or less and 0.01 to 10.0 parts by volume of carbon black (C) with respect to 100 parts by volume of a liquid crystal polyester (A).

2 Claims, No Drawings

LIQUID CRYSTAL POLYESTER RESIN COMPOSITION AND CAMERA MODULE COMPONENT

TECHNICAL FIELD

The present invention relates to a liquid crystal polyester resin composition and a camera module component obtained by molding the same.

BACKGROUND ART

A camera module to be mounted on a mobile phone, a digital camera and the like is composed of components, such as a barrel (a part in which lenses are placed), a holder (a part where the barrel is attached or supported) and the like. Recently, some camera module components have been manufactured by a liquid crystalline resin composition superior to heat resistance, mechanical properties and dimension accuracy, and capable of thin-wall molding.

By the way, in assembling steps of a camera module, a powder of a resin composition may fall from the surface of a component when assembling the component. Such a powder causes image defects if it is dropped on a CMOS sensor. In the case of a component made of a liquid crystalline resin, a phenomenon called fibrillation is one cause of the falling. This is the phenomenon in which fuzzing is generated on the surface of the component due to ultrasonic washing of the camera module component.

So far, a technique to suppress fibrillation due to ultrasonic washing has been studied, and for example, the following Patent Literature 1 proposes a liquid crystalline resin composition for injection molding, which contains silica having an average primary particle size of 5 μm or less.

CITATION LIST

Patent Literature

Patent Literature 1: Japanese Patent Application Laid-Open Publication No. 2010-106165

SUMMARY OF INVENTION

Technical Problem

By improvement in number of pixels associated with higher performance of a camera, sometimes even a tiny external material having the size of less than 1 μm may cause defects. Thus, each component before assembling, and furthermore, an assembly need to be sufficiently washed. However, a component made of a liquid crystalline resin is likely to be fibrillated by ultrasonic washing under severe conditions. According to the studies of the present inventors, it has been proved that even a molded body made of the resin composition of the above Patent Literature 1 is fibrillated by lengthening washing time with ultrasonic wave.

The present invention has been made in view of the above circumstances, and it is the object of the present invention to provide a liquid crystal polyester resin composition capable of obtaining a molded body which is not easily fibrillated, and a camera module component prepared by molding the same.

Solution to Problem

In order to solve the above problem, the present inventors studied intensively to discover that, by molding a liquid crystal polyester resin composition obtained by compounding a liquid crystal polyester, a specific particle, and carbon black at a specific ratio, a molded body which has favorable properties as a camera module component and in which fibrillation is sufficiently suppressed even if it is ultrasonic washed can be obtained, thereby completing the present invention based on the insight.

The present invention provides a liquid crystal polyester resin composition containing 5 to 40 parts by volume of barium sulfate (B) having a particle size of 1 μm or less and 0.01 to 10.0 parts by volume of carbon black (C) with respect to 100 parts by volume of a liquid crystal polyester (A).

According to the liquid crystal polyester resin composition of the present invention, a molded body which is not easily fibrillated by ultrasonic washing can be obtained.

Fibrillation is a phenomenon generated due to the fibrous molecular structure specific to a liquid crystal polymer. The present inventors think that the mechanism is as follows: friction occurs by applying energy such as an ultrasonic wave to molecules arranged in a fibrous state and the molecules are twisted each other to be deposited on the surface. The present inventors imagine invention, the barium sulfate having the above specific particle size is compounded into the resin composition so that fibrous molecules in a molded body come into a moderately flexed state, thereby suppressing friction between the molecules and highly suppressing fibrillation.

Furthermore, by having the above constitution, the liquid crystal polyester resin composition of the present invention can have in combination sufficient mechanical properties and heat resistance, as well as sufficient blackness as camera module component in addition to the excellent fibrillation suppressing effect.

When the content of the constituent (B) is less than the above lower limit, it becomes difficult to obtain the fibrillation suppressing effect sufficiently, and when it exceeds the above upper limit, strand disturbance becomes easy to occur and pelletization becomes difficult. When the content of the constituent (C) is less than the above lower limit, it becomes difficult to obtain a sufficiently black molded body, and when it exceeds the above upper limit, it becomes difficult to obtain the fibrillation suppressing effect sufficiently.

The present invention also provides a camera module component prepared by injection molding the liquid crystal polyester resin composition of the present invention.

The camera module component of the present invention may be not easily fibrillated even by ultrasonic washing because of being made of the liquid crystal polyester resin composition of the present invention. In addition, the camera module component of the present invention can have both sufficient mechanical properties and heat resistance, as well as sufficient blackness as a camera module component.

Advantageous Effects of Invention

According to the present invention, a liquid crystal polyester resin composition capable of obtaining a molded body which is not easily fibrillated, and a camera module component prepared by molding the same can be provided.

DESCRIPTION OF EMBODIMENTS

<Regarding Liquid Crystal Polyester (A)>

The liquid crystal polyester used in the present invention (hereinafter, occasionally simply abbreviated as "LCP") is among those forming anisotropic melt, and, among those, it is preferable to use a wholly aromatic thermotropic liquid crystal polyester which is substantially obtained by polycondensation of only aromatic compounds. The liquid crystal polyester may be used alone or in a combination of two or more kinds thereof.

Examples of the wholly aromatic thermotropic liquid crystal polyester include a material made from a combination of an aromatic dicarboxylic acid, an aromatic diol, and an aromatic hydroxycarboxylic acid, a material made from different aromatic hydroxycarboxylic acids, a material made from a combination of an aromatic dicarboxylic acid and an aromatic diol, and a material made by reacting a polyester such as polyethylene terephthalate with an aromatic hydroxycarboxylic acid.

Preferably, the wholly aromatic thermotropic liquid crystal polyester has a melting point of 300° C. or higher. By adding such LCP, a camera module component which even can withstand solder reflow step and is superior in heat resistance can be manufactured.

In order to obtain the wholly aromatic thermotropic liquid crystal polyester having a melting point of 300° C. or higher, p-hydroxybenzoic acid is appropriately used as a raw material monomer at 40 mol % or higher. In addition to this, another known aromatic hydroxycarboxylic acid, aromatic dicarboxylic acid, and aromatic diol may be appropriately used in combination. Preferable examples include a polyester obtained from only aromatic hydroxycarboxylic acid, such as p-hydroxybenzoic acid and 2-hydroxy-6-naphthoic acid, and a liquid crystalline polyester obtained from these, an aromatic dicarboxylic acid, such as terephthalic acid, isophthalic acid and 2,6-naphthalene dicarboxylic acid, and/or an aromatic diol, such as hydroquinone, resorcinol, 4,4'-dihydroxydiphenyl and 2,6-dihydroxynaphthalene.

A wholly aromatic thermotropic liquid crystal polyester obtained by polycondensation of 80 to 100 mol % of p-hydroxybenzoic acid (a), terephthalic acid (b), and 4,4'-dihydroxybiphenyl (c) (including derivatives thereof) (note that the total of (a) and (b) is 60 mol % or higher), and 0 to 20 mol % of another aromatic compound which can be polycondensed with any of (a), (b), and (c) is mentioned especially preferably.

In order to decrease the heat deterioration in steps by reducing melt polycondensation time in manufacturing of liquid crystal polyester, it is preferable to carry out the melt polycondensation after acetylating in advance a hydroxyl group in the above monomer. Furthermore, in order to simplify steps, the acetylation is preferably carried out by feeding anhydrous acetic acid to the monomer in a reaction tank, and the acetylation step is preferably carried out using the same reaction tank with the melt polycondensation step. That is, it is preferable to carry out the acetylation reaction of the raw material monomer in the reaction tank with the anhydrous acetic acid, and after the reaction is finished, raise the temperature to transfer to the polycondensation reaction.

For the acetylated monomer, the melt polycondensation reaction can be carried out with a deacetylation reaction. As the reaction tank, it is preferable to use a reaction tank equipped with monomer feeding means, acetic acid discharging means, molten polyester recovering means, and stirring means. Such a reaction tank (polycondensation apparatus) can be appropriately selected from known apparatuses. A polymerization temperature is preferably 150° C. to 350° C. After the acetylation reaction is finished, preferably, the temperature is raised to a polymerization initiation temperature to start polycondensation, and then is raised at a rate within the range of 0.1° C./min to 2° C./min up to a final temperature of 280 to 350° C. In this manner, preferably, the polycondensation temperature is also increased in response to the increase of the melt temperature of the produced polymer due to progress of the polycondensation. In the polycondensation reaction, a catalyst known as polycondensation catalyst for polyester may be used. Examples of the catalyst include metal catalysts, such as magnesium acetate, stannous acetate, tetrabutyl titanate, lead acetate, sodium acetate and potassium acetate, and an organic compound catalyst such as N-methylimidazole.

In the melt polycondensation, when the pour point reaches 200° C. or higher, preferably 220° C. to 330° C., the liquid crystal polyester at a low degree of polymerization is recovered from the polymerization tank in a molten state, is fed to a cooler, such as a steel belt and a drum cooler, and is cooled to be solidified.

Then the solidified liquid crystal polyester at a low degree of polymerization is crushed to a size suitable for the following solid phase polycondensation reaction. Although the crushing method is not particularly limited, preferable examples of the crushing method include methods using an apparatus, for example, an impact grinder, such as Feather Mill, Victory Mill, Coloplex, Pulverizer, Contraplex, Scroll Mill, and ACM Pulverizer manufactured by Hosokawa Micron Corporation, and Roll Granulator which is a bridged particle cracking grinder manufactured by MATSUBO Corporation. The method using Feather Mill manufactured by Hosokawa Micron Corporation is especially preferable. Although the particle size of the crushed product is not particularly limited in the present invention, the range of passing through 4 mesh to not passing through 2000 mesh by an industrial sieve (Tyler mesh) is preferable, the range of 5 mesh to 2000 mesh (0.01 to 4 mm) is more preferable, and the range of 9 mesh to 1450 mesh (0.02 to 2 mm) is most preferable.

Next, the crushed product obtained by the crushing step is forwarded to a solid phase polycondensation step to carry out solid phase polycondensation. An apparatus and operation conditions to be applied in the solid phase polycondensation step are not particularly limited, and a known apparatus and methods may be used.

From the viewpoint of productivity (of compounding), apparent viscosity of the liquid crystal polyester (A) is preferably 10 to 300 Pa·s. The apparent viscosity here means melt viscosity at a temperature of the melting point of the liquid crystal polyester+20° C. when measuring the melt viscosity of the liquid crystal polyester while heating at a shear rate of 100 sec$^{-1}$ and a constant temperature increase rate of +4° C./min from 300° C., by using a capillary rheometer (Model 2010) manufactured by INTESCO co., Ltd., with a capillary having diameter of 1.0 mm, length of 40 mm, and inflow angle of 90°.

The content of the liquid crystal polyester (A) in the resin composition is 50 to 90 vol. %, on the basis of the total amount of the resin composition.

<Regarding Barium Sulfate (B)>

Barium sulfate used in the present invention means an ionic crystalline compound represented by BaSO$_4$, and is broadly used as paints, inks, additives for plastics and white pigments. The barium sulfate may be a crushed product of barite called natural barite, or precipitated barium sulfate produced by a chemical reaction.

In the present invention, barium sulfate particles having a primary (number average) particle size of 1 μm or less are used. As the barium sulfate, a commercial product may be used. Examples of the commercial product include "300" (precipitated barium sulfate, primary number average particle size of 0.7 μm) and "BF-20" (precipitated barium sulfate, primary particle size of 0.03 μm) manufactured by Sakai Chemical Industry Co., Ltd.

The content of the barium sulfate (B) in the resin composition is 5 to 40 parts by volume, and preferably 10 to 35 parts by volume, with respect to 100 parts by volume of the liquid crystal polyester (A). When the content of the barium sulfate (B) is less than the above lower limit, it tends to become difficult to obtain the fibrillation suppressing effect sufficiently. On the other hand, when it exceeds the above upper limit, strand disturbance becomes easy to occur and pelletization becomes difficult.

<Regarding Carbon Black (C)>

Carbon black used in the present invention is used for resin coloring and is generally available, and is not particularly limited. Examples of the commercial product include "REGAL99I" manufactured by Cabot Corporation.

The content of the carbon black (C) in the resin composition is 0.01 to 10.0 parts by volume, and preferably 1.0 to 3.0 parts by volume, with respect to 100 parts by volume of the liquid crystal polyester (A). When the content of the carbon black (C) is less than the above lower limit, it becomes difficult to obtain a sufficiently black molded body, and thus, the jet blackness is decreased and the light blocking property tends to become insufficient. When it exceeds the above upper limit, it becomes difficult to obtain the fibrillation suppressing effect sufficiently.

<Regarding Other Additives>

One, or two or more various additives may be added to the resin composition of the present invention insofar as the object of the present invention is not impaired. Examples of the additives include a fibrous inorganic filler, such as a glass fiber, wollastonite and a potassium titanate fiber, an antioxidant and a thermal stabilizer (for example, hindered phenol, hydroquinone, phosphites and substitution products thereof), an ultraviolet absorber (for example, resorcinol, a salicylate, benzotriazole and benzophenone), a lubricant and a mold lubricant (montanoic acid and a salt, ester and half ester thereof, stearyl alcohol, stearamide, polyethylene wax, and the like), common additives, such as a plasticizer, an antistatic agent, and a flame retardant, and another thermoplastic resin. By adding these additives, a certain property may be imparted to the resin composition.

In order to improve strength of a weld part of a molded object, a glass fiber may be added to the resin composition of the present invention insofar as the object of the present invention is not impaired.

<Regarding Glass Fiber (D)>

As a glass fiber used in the present invention, materials used as a general resin reinforcement, such as chopped glass fiber and milled glass fiber, may be preferably used, but milled glass fiber is preferable.

The fiber length of a glass fiber used, by a number average length, is preferably 10 μm to 1 mm, and more preferably 50 μm to 200 μm. The thickness of the glass fiber, by the number average diameter, is preferably 5 to 20 μm from the viewpoint of fluidity in injection molding, and further preferably, 7 to 15 μm. Preferable specific example of the glass fiber includes "EFH150-01" (number average fiber diameter of 10 μm, number average fiber length of 150 μm) manufactured by Central Glass Fiber Co., Ltd.

The content of the glass fiber (D) is preferably 0 to 50 parts by volume, and more preferably 5 to 15 parts by volume, with respect to 100 parts by volume of the liquid crystal polyester (A). When the content of the glass fiber (D) exceeds the above upper limit, it tends to become difficult to obtain the fibrillation suppressing effect sufficiently.

In the resin composition of the present invention, from the viewpoint of suppressing fibrillation, preferably, the content of nonfibrous-and-unshaped or spherical inorganic particles having a particle size of more than 1 μm is 50 parts by volume or less with respect to 100 parts by volume of the liquid crystal polyester (A), and more preferably, nonfibrous-and-unshaped or spherical inorganic particles having a particle size of more than 1 μm are not substantially contained.

The liquid crystal polyester resin composition of the present invention can be favorably used for molding a camera module component.

Preferably, the liquid crystal polyester resin composition of the present invention has apparent viscosity within the range of 10 to 200 (Pa·s), which is measured at the shear rate of 100 sec$^{-1}$ and the temperature of the melting point of the liquid crystal polyester (A)+20° C. This is because, when the apparent viscosity is out of the range, surface quality of an injection molded object is deteriorated and falling objects are increased. The apparent viscosity is obtained by evaluating melt viscosity at the temperature of the melting point of the liquid crystal polyester (A)+20° C. by carrying out melt viscosity measurement while heating at the shear rate of 100 sec$^{-1}$ and the constant temperature increase rate of +4° C./min from 300° C. using a capillary rheometer (Model 2010) manufactured by INTESCO Co., Ltd., with a capillary having diameter of 1.00 mm, length of 40 mm, and inflow angle of 90°.

A camera module component of the present invention described below can be obtained by injection molding the liquid crystal polyester resin composition of the present invention, and it is preferable that the apparent viscosity of the liquid crystal polyester resin composition be within the above range so that a molded object exerts intended rigidity and sliding performance. In the case where a component is thin, for example, has a minimum thickness of 0.2 to 0.8 mm, by using the resin composition whose apparent viscosity is within the above range, when the resin composition is injected and filled into a space having the thickness of 0.2 to 0.8 mm within a mold at high speed, the resin composition can flow uniformly within the mold and a molded object without a composition bias can be obtained. The camera module component obtained in this manner excels in abrasion resistance and rigidity, and may sufficiently suppress falling objects from the molded object surface.

<Regarding Manufacturing Method of Liquid Crystal Polyester Resin Composition>

The liquid crystal polyester resin composition of the present invention can be obtained by melt-kneading the above-described respective constituents (liquid crystal polyester, barium sulfate particles, carbon black, glass fibers as necessary and the like). As an apparatus for melt-kneading, a twin-screw kneader can be used. A twin-screw continuous extrusion kneaders having a pair of double-thread screws is more preferable, and among them, a co-rotating kneader having reversed flow mechanism which allows fillers to be uniformly dispersed is preferable. By using a kneader which has a cylinder diameter of 40 mmφ or more, and having a large clearance between a barrel and a screw that makes the filler penetrate easily, which has a large clearance between screws with intermeshing rate of 1.45 or more, and in which the filler can be fed halfway across the cylinder, the resin composition of the present invention can be efficiently obtained. In addition, preferably, a kneader having a system for feeding at least a part of the glass fiber halfway across the cylinder is used.

Preferably, the liquid crystal polyester, the barium sulfate particle, and the carbon black are mixed by using a known solid mixing facility, such as ribbon blender, tumbler blender, Henschel mixer and the like, is dried by hot air dryer, reduced-pressure dryer or the like as necessary, and is fed from a hopper of the twin-screw kneader.

In manufacturing the resin composition containing the glass fiber, at least a part of the glass fiber to be compounded thereinto can be fed from a midway point of the cylinder of the twin-screw kneader (so-called side feed). Thus, mechanical strength of a weld part of a molded body prepared by injection molding the resin composition to be obtained tends to be more improved compared to the case where all of the glass fibers are fed from the hopper together with other raw materials (so-called top feed).

<Regarding Camera Module Component>

A camera module component of the present invention can be obtained from the above composition by injection molding. Injection molding conditions or an injection molding machine are not particularly limited as long as they are known conditions or machine generally used for molding liquid crystal polyester.

Preferably, the camera module component of the present invention has bending strength of 120 MPa or more, and more preferably, 140 MPa or more. The bending strength here means the bending strength measured in conformity with ASTM D790.

Preferably, the camera module component of the present invention has a bending elastic modulus of 10 GPa or more, and more preferably, 12 GPa or more. The bending elastic modulus here means the bending elastic modulus measured in conformity with ASTM D790.

Preferably, the camera module component of the present invention has weld strength of 20 MPa or more, and more preferably, 23 MPa or more. The weld strength here means the bending strength measured for a test piece having a weld part at its center in conformity with ASTM D790.

Preferably, the camera module component of the present invention has a deflection temperature under load of 240° C. or more, and more preferably, 260° C. or more. The deflection temperature under load here means the deflection temperature under load (DTUL) measured in conformity with ASTM D648.

Preferably, the camera module component of the present invention has ΔE of 50 or more, and more preferably, 55 or more. The ΔE here means the value calculated from L, a and b values measured in conformity with JIS Z8729.

EXAMPLES

Hereinafter, the present invention will be described in greater detail through Examples. However, the present invention is not limited to the following Examples.

<Manufacture of Liquid Crystal Polyester (A)>

Into a reaction tank made of SUS316L (stainless steel) having internal volume of 1.7 m$^3$ with a double helical stirring blade, 298.3 kg (2.16 kmol) of p-hydroxybenzoic acid (manufactured by UENO FINE CHEMICALS INDUSTRY, LTD.), 134.1 kg (0.72 kmol) of 4,4'-dihydroxydiphenyl (manufactured by Honshu Chemical Industry Co., Ltd.), 89.7 kg (0.72 kmol) of terephthalic acid (manufactured by Mitsui Chemicals, Inc.), 29.9 kg (0.18 kmol) of isophthalic acid (manufactured by A.G. International Chemical Co., Inc.), and as catalysts 0.11 kg of magnesium acetate (manufactured by KISHIDA CHEMICAL Co., Ltd.) and 0.04 kg of potassium acetate (manufactured by KISHIDA CHEMICAL Co., Ltd.) were charged. After the polymerization tank was nitrogen-substituted by repeating depressurization and nitrogen injection twice, 377.7 kg (3.7 kmol) of anhydrous acetic acid was added thereto, and the temperature was raised to 150° C. for 1.5 hours with the stirring blade at a rotation speed of 45 rpm to carry out an acetylation reaction for 2 hours in a reflux state. After the acetylation reaction, the temperature was raised to 310° C. at a rate of 0.5° C./min in an acetic acid distillation state, and a polycondensation reaction was carried out while removing generated acetic acid.

Then, the reaction tank system was sealed, the inside of the system was pressurized to 14.7 N/cm$^2$ with nitrogen, about 480 kg of the liquid crystal polyester at a low degree of polymerization as a melt polycondensation reaction product in the reaction tank was recovered from an outlet at the bottom of the reaction tank, and was cooled and solidified by a cooling and solidifying apparatus disclosed in Japanese Patent Application Laid-Open Publication No. 2002-179779. A temperature of the melt polycondensation reaction product at this time was 310° C. The obtained melt polycondensation reaction product was crushed by a grinder manufactured by Hosokawa Micron Corporation to a size which can pass a sieve having an opening of 2.0 mm to obtain a prepolymer.

Next, the prepolymer obtained above was filled in a rotary kiln manufactured by Takasago Industry Co. Ltd., nitrogen was passed therethrough at a flow rate of 16 Nm$^3$/hr, the heater temperature was raised from room temperature to 350° C. for 1 hour at a rotation speed of 2 rpm, and is held for 10 hours at 350° C. After confirming that the resin powder temperature in the kiln had reached 295° C., the heating was stopped and the resin powder was allowed to be cooled over 4 hours while rotating the rotary kiln to obtain about 400 kg of the powdery liquid crystal polyester (A). The obtained liquid crystal polyester (A) had a melting point of 350° C., a specific gravity of 1.37, and apparent viscosity of 70 Pa·S.

<Measurement of Melting Point>

The melting point of the liquid crystal polyester (polymer) was measured by a differential scanning calorimeter (DSC) manufactured by SEICO Electronics Industrial Co., Ltd. using α-alumina as a reference (standard). In this case, after the temperature was raised from room temperature to 400° C. at a temperature increase rate of 20° C./min to completely melt the polymer, the temperature was lowered to 150° C. at a rate of 10° C./min and is raised again to 420° C. at a rate of 20° C./min to obtain an endothermic peak, the top of which was determined as the melting point.

<Carbon Black>

As carbon black, trade name "REGAL99I" (primary particle size of 24 nm, specific gravity of 1.9) manufactured by Cabot Corporation was prepared.

<Barium Sulfate Particles>

As barium sulfate particles (I), trade name "300" (primary number average particle size of 0.7 μm, specific gravity of 4.3) manufactured by Sakai Chemical Industry Co., Ltd. was prepared.

As barium sulfate particles (II), trade name "BF-20" (primary number average particle size of 0.03 μm, specific gravity of 4.3) manufactured by Sakai Chemical Industry Co., Ltd. was prepared.

As barium sulfate particles (III), trade name "BMH-60" (primary number average particle size of 6 μm, specific gravity of 4.3) manufactured by Sakai Chemical Industry Co., Ltd. was prepared.

<Silica Particles>

As silica particles (I), trade name "FB-5 SDC" (primary number average particle size of 5 μM, specific gravity of 2.1) manufactured by DENKI KAGAKU KOGYO KABUSHIKI KAISHA was prepared.

As silica particles (II), trade name "SFP-30M" (primary number average particle size of 0.7 μm, specific gravity of 2.1) manufactured by DENKI KAGAKU KOGYO KABUSHIKI KAISHA was prepared.

As silica particles (III), trade name "FB-950" (primary number average particle size of 23 μm, specific gravity of 2.1) manufactured by DENKI KAGAKU KOGYO KABUSHIKI KAISHA was prepared.

<Talc Particles>

As talc particles, trade name "MS-KY" (primary number average particle size of 20 μm, specific gravity of 2.9) manufactured by Nippon Talc Co., Ltd. was prepared.

<Glass Fiber>

Trade name "EFH150-01" (number average length of 150 μm, number average diameter of 10 μm, specific gravity of 2.55) manufactured by Central Glass Fiber Co., Ltd. was prepared.

<Manufacture of Resin Composition>

Example 1

100 parts by volume of the liquid crystal polyester was mixed in advance with 25.0 parts by volume of the barium sulfate particle (I) and 1.0 part by volume of the carbon black by using a ribbon blender, and the mixture was dried in an air oven at 150° C. for 2 hours. The dried mixture was melt-kneaded by using a twin-screw extruder (KTX-46 manufactured by Kobe Steel, Ltd.) whose cylinder was set at a maximum temperature of 380° C., at an extrusion rate of 160 kg/hr to obtain a pellet of a liquid crystal polyester resin composition.

Examples 2 to 5

Pellets of liquid crystal polyester resin compositions were respectively obtained by the same apparatus and operation method as in Example 1, except that the respective constituents were mixed in accordance with compositions shown in Table 1 (the compositions in the table are expressed in parts by volume).

Comparative Examples 1 to 6 and 8

Pellets of liquid crystal polyester resin compositions were respectively obtained by the same apparatus and operation method as in Example 1, except that the respective constituents were mixed in accordance with compositions shown in Table 1 (the compositions in the table are expressed in parts by volume).

Comparative Example 7

Although a pellet of a liquid crystal polyester resin composition was tried to be obtained by the same apparatus and operation method as in Example 1, except that the respective constituents were mixed in accordance with compositions shown in Table 1 (the compositions in the table are expressed in parts by volume), a pellet could not be stably obtained because strand disturbance was generated.

<Evaluation of Productivity>

The productivity of the liquid crystal polyester resin compositions of Examples and Comparative Examples was evaluated as "A" when a strand could be stably drawn and a pellet could be obtained or "B" when strand disturbance was generated and stable pelletization was not possible, under the above pellet manufacturing conditions.

<Production of Test Piece by Injection Molding Method>

The pellets of the resin compositions obtained in Examples and Comparative Examples above were injection molded at a cylinder with maximum temperature of 350° C., the injection speed of 100 mm/sec, and the mold temperature of 80° C. using an injection molding machine (SG-25 manufactured by Sumitomo Heavy Industries, Ltd.) to produce ASTM bending test pieces (strip test pieces). Furthermore, the pellets were injection molded at a cylinder with maximum temperature of 350° C., the injection speed of 300 mm/sec, and the mold temperature of 80° C. using an injection molding machine (UH-1000 manufactured by NISSEI PLASTIC INDUSTRIAL CO., LTD.) to produce test pieces for measuring weld part strength, each of which has a size of 13 mm width×80 mm length×1 mm thickness and a weld at its center.

<Evaluation of Suppression of Fibrillation>

For the strip test pieces obtained above, ultrasonic washing was carried out in water at the temperature of 30° C. for 4 hours using a ultrasonic washer "VS-150" manufactured by IUCHI Co. The test pieces after washing were observed by images obtained by magnifying them 300 times and 500 times using a digital microscope VHX-1000 manufactured by Keyence Corporation, and the presence or absence of fibrils deposited on their surfaces were examined. Suppression of fibrillation was evaluated as "A" when fibrils were not generated, and "B" when fibrils were generated, under the above conditions.

<Measurement of Bending Strength>

Bending strength was measured in accordance with ASTM D790 by using the strip test pieces produced above.

<Measurement of Bending Elastic Modulus>

Bending elastic modulus was measured in accordance with ASTM D790 by using the strip test pieces produced above.

<Measurement of Weld Strength>

Bending strength of the weld part was measured in accordance with ASTM D790 by using the test pieces for measuring weld part strength, produced above, and the bending strength of the weld part was determined as weld strength.

<Measurement of Deflection Temperature Under Load (DTUL)>

Measurement of a deflection temperature under load (DTUL) was performed in accordance with ASTM D648 by using the strip test pieces produced above.

<Evaluation of Blackness>

L, a, and b values were measured in accordance with TIS Z8729 with a spectrophotometer (U-3500 manufactured by Hitachi, Ltd.) by using the strip test pieces produced above, and ΔE which is a difference from a standard white color was calculated.

<Measurement of Apparent Viscosity>

Melt viscosity was measured while heating at a shear rate of 100 $\text{sec}^{-1}$ and a constant temperature increase rate of +4° C./min from 300° C., by using a capillary rheometer (2010, manufactured by INTESCO Co., Ltd.), with a capillary having diameter of 1.0 mm, length of 40 mm, and inflow angle of 90°, and melt viscosity at the temperature of 370° C. was evaluated and determined as apparent viscosity. In the measurement, the liquid crystal polyester and the resin composition were dried in advance in a vacuum dryer at 150° C. for 4 hours.

TABLE 1

|  | Liquid crystal polyester | Carbon black | Barium sulfate particles (I) (0.7 μm) | Barium sulfate particles (II) (0.03 μm) | Barium sulfate particles (III) (6 μm) | Silica particles (I) (5 μm) | Silica particles (II) (0.7 μm) | Silica particles (III) (23 μm) | Talc particles (20 μm) | Glass fibers |
|---|---|---|---|---|---|---|---|---|---|---|
| Ex. 1 | 100 | 1.0 | 25.0 | — | — | — | — | — | — | — |
| Ex. 2 | 100 | 1.0 | — | 25.0 | — | — | — | — | — | — |
| Ex. 3 | 100 | 1.0 | 32.0 | — | — | — | — | — | — | — |
| Ex. 4 | 100 | 1.0 | 10.0 | — | — | — | — | — | — | — |
| Ex. 5 | 100 | 1.0 | 10.0 | — | — | — | — | — | — | 5.0 |
| Com. Ex. 1 | 100 | 1.0 | — | — | 25.0 | — | — | — | — | — |
| Com. Ex. 2 | 100 | 1.0 | — | — | — | 25.0 | — | — | — | — |
| Com. Ex. 3 | 100 | 1.0 | — | — | — | — | 25.0 | — | — | — |
| Com. Ex. 4 | 100 | 1.0 | — | — | — | — | — | 25.0 | — | — |
| Com. Ex. 5 | 100 | 1.0 | — | — | — | — | — | — | 21.4 | 18.0 |
| Com. Ex. 6 | 100 | 1.0 | 3.0 | — | — | — | — | — | — | — |
| Com. Ex. 7 | 100 | 1.0 | 50.0 | — | — | — | — | — | — | — |
| Com. Ex. 8 | 100 | 12.0 | 32.0 | — | — | — | — | — | — | — |

The compositions in the table are expressed in parts by volume.

TABLE 2

|  | Productivity | Suppression of fibrillation | Bending strength (MPa) | Bending elastic modulus (GPa) | Weld strength (MPa) | Deflection temperature under load (° C.) | Blackness (ΔE) | Apparent viscosity (Pa·S) |
|---|---|---|---|---|---|---|---|---|
| Ex. 1 | A | A | 168 | 13.8 | 25 | 270 | 56 | 108 |
| Ex. 2 | A | A | 165 | 13.0 | 22 | 268 | 56 | 143 |
| Ex. 3 | A | A | 171 | 13.9 | 24 | 268 | 56 | 150 |
| Ex. 4 | A | A | 125 | 11.0 | 23 | 260 | 57 | 95 |
| Ex. 5 | A | A | 145 | 11.6 | 30 | 266 | 56 | 100 |
| Com. Ex. 1 | A | B | 170 | 13.8 | 23 | 270 | 56 | 135 |
| Com. Ex. 2 | A | B | 120 | 10.7 | 24 | 262 | 52 | 283 |
| Com. Ex. 3 | A | B | 135 | 11.0 | 23 | 263 | 52 | 260 |
| Com. Ex. 4 | A | B | 114 | 10.2 | 22 | 264 | 52 | 278 |
| Com. Ex. 5 | A | B | 138 | 14.0 | 35 | 260 | 53 | 105 |
| Com. Ex. 6 | A | B | 120 | 10.4 | 26 | 263 | 54 | 82 |
| Com. Ex. 7 | B | — | — | — | — | — | — | — |
| Com. Ex. 8 | A | B | 103 | 9.7 | 22 | 240 | 62 | 210 |

As shown in Table 2, each of the liquid crystal polyester resin compositions of Examples 1 to 5, which contains barium sulfate having a particle size of 1 μm or less and satisfies the conditions according to the present invention, had excellent productivity and a molded object which is not easily fibrillated could be obtained. In addition, each of the resin compositions of Examples 1 to 5 had low apparent viscosity, thereby exhibiting excellent moldability, and an excellent result that the bending strength, elastic modulus, and weld strength of the molded object are also high. Furthermore, each of the molded objects of the resin compositions of Examples 1 to 5 had the deflection temperature under load (DTUL) of 260° C. or more and excellent heat resistance.

Furthermore, according to the liquid crystal polyester resin composition of the present invention, which contains barium sulfate having a particle size of 1 μm or less, the blackness of the molded object can be heightened compared to a composition containing silica and talc even if the content of carbon black is the same, and the blackness required for a camera module component can be achieved with lower quantity of carbon black than a composition using silica and talc.

On the other hand, in the composition of Comparative Example 1 using barium sulfate having a particle size of more than 1 μm, fibrils were generated on the molded object. In addition, also in each of the compositions of Comparative Examples 2 to 4 containing silica, a fibril was generated on the molded object, and bending strength and the bending elastic modulus were lowered. Furthermore, each of the compositions of Comparative Examples 2 to 4 has a higher apparent viscosity, and thus can be regarded as inferior in thin-wall moldability compared to the compositions of Examples 1 to 5. The molded object obtained from the composition of Comparative Example 5 using talc and a glass fiber has excellent weld strength and the like, but a fibril was generated. In the molded object obtained from the composition of Comparative Example 6, in which the content of barium sulfate is less than the lower limit according to the present invention, a fibril was generated and bending strength and the like were low. In the composition of Comparative Example 7, in which the content of barium sulfate is more than the upper limit according to the present invention, strand disturbance was generated, and the pellets could not be stably obtained. Moreover, in the composition of Comparative Example 8, in which the content of carbon black is more than the upper limit according to the present invention, apparent viscosity was increased, and fibrils were generated because of the bad surface shape of the molded object obtained from the composition.

Industrial Applicability

According to the liquid crystal polyester resin composition of the present invention, a molded body which is not easily fibrillated can be obtained. Moreover, the camera module component of the present invention obtained from the liquid crystal polyester resin composition of the present invention can sufficiently suppress fibrillation on a molded object surface even if ultrasonic washing is carried out under severe conditions, furthermore, excels in moldability, has high strength and heat resistance, and can withstand solder reflow. Therefore, the camera module component can be utilized in various camera module component applications, such as for a lens barrel part and a mount holder part, which can be surface mounted, furthermore, a CMOS (image sensor) frame, a shutter, a shutter bobbin part, and automatic focusing members of, for example, a voice coil motor type and a piezoelectric motor type, in a mobile phone, a laptop computer, a digital camera, a digital video camera and the like.

The invention claimed is:

1. A liquid crystal polyester resin composition, comprising:
    5 to 40 parts by volume of barium sulfate (B) having a particle size of 1 μm or less and 0.01 to 10.0 parts by volume of carbon black (C) with respect to 100 parts by volume of a liquid crystal polyester (A).

2. A camera module component prepared by injection molding the liquid crystal polyester resin composition according to claim 1.

* * * * *